(12) United States Patent
Huang et al.

(10) Patent No.: US 9,171,678 B2
(45) Date of Patent: Oct. 27, 2015

(54) SUPERCAPATTERY AND METHOD FOR CONTROLLING CHARGE/DISCHARGE OF THE SUPERCAPATTERY BY USING A MAGNETIC FORCE

(71) Applicant: NATIONAL PINGTUNG UNIVERSITY OF SCIENCE AND TECHNOLOGY, Pingtung County (TW)

(72) Inventors: Wu-Jang Huang, Pingtung County (TW); Chang-Hsien Tai, Pingtung County (TW); Yan-Jia Liou, Pingtung County (TW)

(73) Assignee: National Pingtung University of Science & Technology, Neipu Hsiang, Pintung County (TW)

( * ) Notice: Subject to any disclaimer, the term of this patent is extended or adjusted under 35 U.S.C. 154(b) by 148 days.

(21) Appl. No.: 14/067,408

(22) Filed: Oct. 30, 2013

(65) Prior Publication Data

US 2014/0176075 A1    Jun. 26, 2014

(30) Foreign Application Priority Data

Dec. 22, 2012    (TW) .............................. 101149379 A

(51) Int. Cl.
*H02J 7/00*    (2006.01)
*H01G 11/10*   (2013.01)
*H01G 11/14*   (2013.01)
*H01G 11/54*   (2013.01)

(52) U.S. Cl.
CPC .............. *H01G 11/10* (2013.01); *H01G 11/14* (2013.01); *H01G 11/54* (2013.01)

(58) Field of Classification Search
CPC ........ H01G 11/10; H01G 11/54; H01G 11/14
See application file for complete search history.

(56) References Cited

U.S. PATENT DOCUMENTS

| | | | |
|---|---|---|---|
| 4,974,118 A * | 11/1990 | Rounds .......................... | 361/311 |
| 6,208,502 B1 | 3/2001 | Hudis et al. | |
| 6,423,260 B1 * | 7/2002 | Chartoff et al. ............... | 264/401 |
| 6,687,116 B2 | 2/2004 | Hudis | |
| 6,836,098 B1 * | 12/2004 | O'Brien ......................... | 320/166 |
| 7,008,563 B2 * | 3/2006 | Smalley et al. ............... | 252/511 |
| 7,019,391 B2 * | 3/2006 | Tran .............................. | 257/678 |
| 7,023,107 B2 * | 4/2006 | Okuda et al. .................. | 307/10.1 |
| 7,326,497 B2 * | 2/2008 | Matsubara et al. ......... | 429/231.8 |
| 7,407,025 B2 * | 8/2008 | Urakabe et al. .............. | 180/65.1 |
| 7,893,662 B2 * | 2/2011 | Ribellino et al. ............. | 320/167 |

(Continued)

*Primary Examiner* — Naum B Levin
(74) *Attorney, Agent, or Firm* — Muncy, Geissler, Olds & Lowe, P.C.

(57) ABSTRACT

A supercapattery includes at least one tank filled with a conductive material. The conductive material has an arrangement-variable crystal lattice. The conductive material is graphite, grapheme, graphene oxide, a composite of graphite, metal, and a polymer, or a composite of graphene, metal, and a polymer. A magnetic member is mounted outside of the at least one tank. The magnetic member can be supplied with electricity to create a magnetic field. A method for controlling charge/discharge of a supercapattery includes supplying electricity to a supercapattery filled with a conductive material having an arrangement-variable crystal lattice. The crystal lattice of the conductive material supplied with electricity is transformed from an isotropic phase into an electro-nematic phase and absorbs electrons. An external magnetic field is created to return the crystal lattice of the conductive material from the electro-nematic phase to the isotropic phase, releasing the electrons.

4 Claims, 5 Drawing Sheets

(56) References Cited

U.S. PATENT DOCUMENTS

| | | | |
|---|---|---|---|
| 7,947,199 B2* | 5/2011 | Wessling | 252/500 |
| 8,698,717 B2* | 4/2014 | Arasawa et al. | 345/87 |
| 2006/0115640 A1* | 6/2006 | Yodh et al. | 428/221 |
| 2010/0195263 A1 | 8/2010 | Sweeney et al. | |
| 2011/0255212 A1* | 10/2011 | Liu et al. | 361/502 |
| 2012/0175604 A1* | 7/2012 | Hanna et al. | 257/40 |
| 2013/0026978 A1* | 1/2013 | Cooley et al. | 320/107 |
| 2013/0130049 A1* | 5/2013 | Moilanen et al. | 428/532 |
| 2013/0162216 A1* | 6/2013 | Zhamu et al. | 320/130 |
| 2014/0103878 A1* | 4/2014 | Albertson | 320/127 |

* cited by examiner

SUPERCAPATTERY AND METHOD FOR CONTROLLING CHARGE/DISCHARGE OF THE SUPERCAPATTERY BY USING A MAGNETIC FORCE

BACKGROUND OF THE INVENTION

1. Field of the Invention

The present invention relates to a supercapattery and a method for controlling charge/discharge of the supercapattery and, more particularly, to a supercapattery with enhanced charging/discharging efficiency and a method for controlling the charging/discharging efficiency of the supercapattery by using a magnetic force while maintaining charging/discharging stability.

2. Description of the Related Art

Most batteries currently available in the market are lead-acid batteries, nickel-iron batteries, nickel-hydrogen batteries, and lithium-ion batteries. These batteries generate and store electrical energy through photo-electric conversion and chemical action of electrolytes received therein. However, use of these batteries in high power consumption equipment is restricted by the limited service life and the limited storage capacity as well as high costs of these batteries.

Capatteries have been developed to replace the above batteries, and supercapatteries gradually become more advantageous over conventional capatteries in the market.

Most of the supercapatteries use a porous carbon material as the electrode and are filled with a liquid dielectric material as the electrolyte. Electrical energy is stored through separation of charges. As an example, graphene (one of the carbon materials) or its oxide are widely used in recent years to produce supercapatteries with a high charging/discharging speed due to the high thermal conduction property and the high electrical conduction property of graphene.

In operation of a supercapattery, electricity is supplied to an interior of the supercapattery to enable electrons to adhere to the surface of graphene, and electrons are filled between molecules of graphene. The supercapattery is, thus, charged. On the other hand, when the supercapattery becomes a path, the electrons move and are released through the path, resulting in discharge. However, the discharge process of the supercapattery is not properly controlled such that the supercapattery discharges rapidly soon after the supercapattery is fully charged. Thus, the charging efficiency of the supercapattery is poor, reducing the overall electricity storage effect and reducing the charging/discharging stability of the supercapattery.

Thus, a need exists for a novel supercapattery and a method for controlling charge/discharge of the supercapattery to solve the above disadvantages.

SUMMARY OF THE INVENTION

An objective of the present invention is to provide a method for controlling charge/discharge of a supercapattery, such that the supercapattery can have enhanced charging efficiency to increase the electricity storage effect and to provide charging/discharging stability.

Another objective of the present invention is to provide a supercapattery with charging/discharging stability through control of the discharging efficiency of the supercapattery.

The present invention fulfills the above objectives by providing, in a first aspect, a method for controlling charge/discharge of a supercapattery by using a magnetic force. The method includes supplying electricity to a supercapattery filled with a conductive material. The conductive material has an arrangement-variable crystal lattice. The crystal lattice of the conductive material supplied with electricity is transformed from an isotropic phase into an electro-nematic phase and absorbs electrons. An external magnetic field is created to return the crystal lattice of the conductive material from the electro-nematic phase to the isotropic phase, releasing the electrons.

The conductive material is graphite, graphene, graphene oxide, a composite of graphite, metal, and a polymer, or a composite of graphene, metal, and a polymer.

The external magnetic field can be created by electrifying a natural magnet core, an electromagnet, or a superconductive magnet, or by direct microwave arc discharge.

In another aspect, the present invention provides a supercapattery including at least one tank filled with a conductive material. The conductive material has an arrangement-variable crystal lattice. The conductive material is graphite, graphene, graphene oxide, a composite of graphite, metal, and a polymer, or a composite of graphene, metal, and a polymer. A magnetic member is mounted outside of the at least one tank. The magnetic member is adapted to be supplied with electricity to create a magnetic field.

The magnetic member is an electromagnetic magnet or a superconductive magnet.

The at least one tank includes a plurality of tanks connected to each other in series or in parallel. In an embodiment, some of the tanks are connected to each other in series, and others are connected to each other in parallel.

By changing the crystal lattice of the conductive material, the tight, regular arrangement of the crystal lattice structure inhibits self discharge of the conductive material after supply of electricity. Furthermore, under the action of the external magnetic field, the magnitude of the magnetic field can be changed to effectively modulate the varying frequency of the crystal lattice, such that the fully-charged conductive material in the electro-nematic phase returns to the isotropic phase, leading to movement of electrons and therefore controlling the discharging efficiency of the supercapattery. Thus, by using the method for controlling charge/discharge of a supercapattery by using a magnetic force according to the present invention, the supercapattery can have increased storage capacity and enhanced charging/discharging stability.

The present invention will become clearer in light of the following detailed description of illustrative embodiments of this invention described in connection with the drawings.

BRIEF DESCRIPTION OF THE DRAWINGS

FIG. 1b shows an enlarged view of a circled portion A of FIG. 1a.

FIG. 2b shows an enlarged view of a circled portion B of FIG. 2a.

DETAILED DESCRIPTION OF THE INVENTION

A method for controlling charge/discharge of a supercapattery by using a magnetic force according to the present invention can be used on various supercapatteries. After supply electricity to a supercapattery, a conductive material (usually having an arrangement-variable crystal lattice) in the supercapattery is turned into an electro-nematic phase.

The method for controlling charge/discharge of a supercapattery by using a magnetic force according to the present invention includes supplying electricity to a supercapattery filled with a conductive material. The conductive material has an arrangement-variable crystal lattice. The crystal lattice of the conductive material supplied with electricity is transformed from an isotropic phase into an electro-nematic phase and absorbs electrons. After the supercapattery is fully charged and is intended to discharge, an external magnetic field is created to return the crystal lattice of the conductive material from the electro-nematic phase to the isotropic phase. The electrons are released under the action of the external magnetic field.

The conductive material is graphite, graphene, graphene oxide, a composite of graphite, metal, and a polymer, or a composite of graphene, metal, and a polymer. The external magnetic field can be created by electrifying a natural magnet core, an electromagnet, or a superconductive magnet, or by direct microwave arc discharge, which is well known in the art.

By changing the crystal lattice of the conductive material through supply of electricity, the crystal characteristics of the conductive material are changed after fully absorbing electrons. Namely, the crystal phase in the isotropic arrangement is transformed into electro-nematic phase. The tight, regular arrangement of the crystal lattice structure inhibits self discharge of the conductive material.

Furthermore, under the action of the external magnetic field, the attraction force of the magnetic field can be used to effectively change the arrangement of the crystal lattice, returning the conductive material in the electro-nematic phase to the isotropic phase. The electrons move to proceed with discharge. Further, the magnitude of the magnetic field can be used to modulate the frequency of the crystal lattice to effectively control the discharging efficiency, increasing the storage capacity of the supercapattery and providing charging/discharging stability.

The sequence of the above steps can be adjusted according to the actual situations for the purposes of maintaining charge/discharge of the supercapattery. An example of charge/discharge of the supercapattery will now be set forth.

Figure 1A:
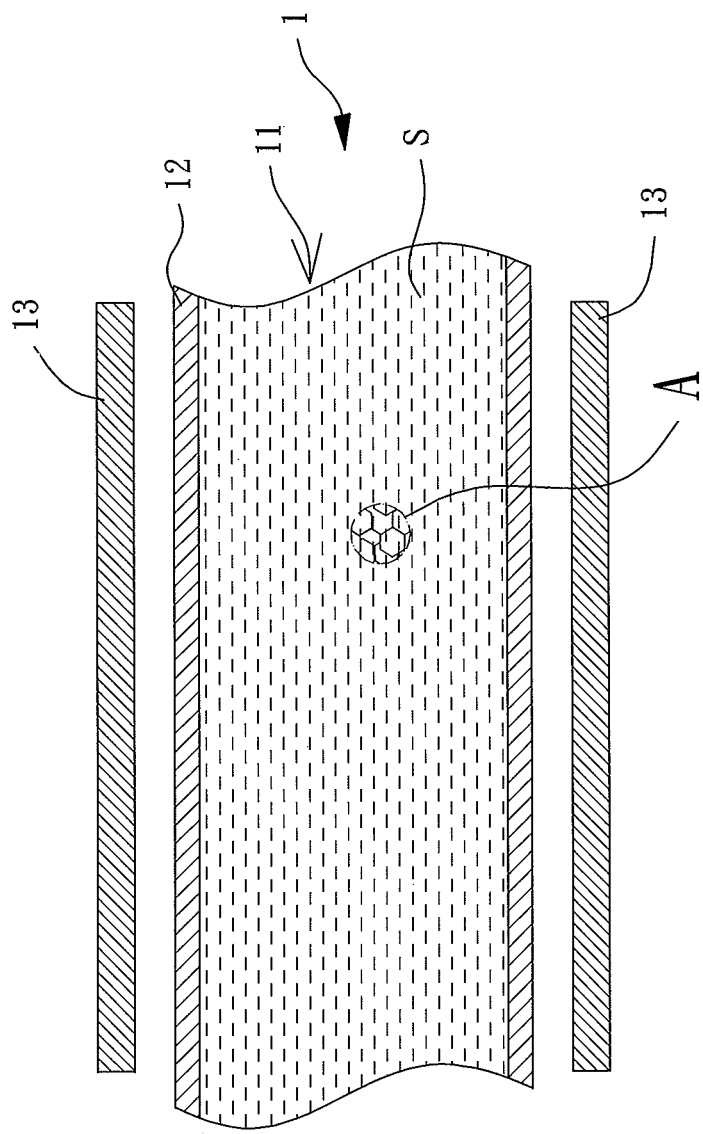
FIG. 1a is a diagrammatic cross sectional view of a supercapattery according to the present invention, with the supercapattery in a charging process.

With reference to FIG. 1a, the supercapattery 1 includes a tank 11, an electrode unit 12 and a magnetic member 13. The electrode unit 12 is located in the tank 11. The magnetic member 13 is located outside of the tank 11 and can create a magnetic field when supplied with electricity. A conductive material S is filled in the tank 11 and includes an arrangement-variable crystal lattice. Preferably, the conductive material S is graphene oxide. The storage capacity of the supercapattery 1 can be increased by the high thermal conduction property and the high electrical conduction property of the conductive material S. The magnetic member 13 can be an electromagnet or a superconductive magnet.

Figure 1B:
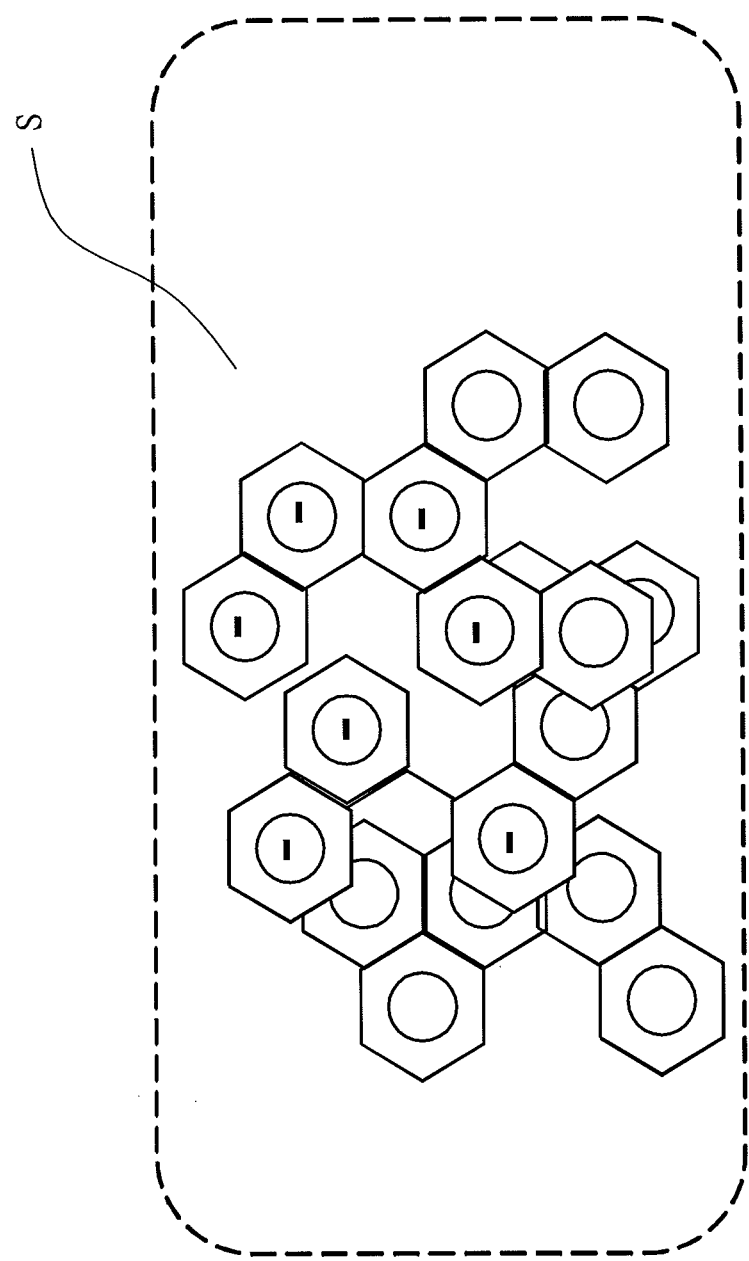

With reference to FIGS. 1a and 1b, when electric current is supplied to the electrode unit 12 in the tank 11, the crystal lattice the conductive material S absorbs electrons and is transformed from an isotropic phase into an electro-nematic phase. Namely, after the surface of the grapheme is charged, the liquid phase grapheme oxide is transformed into a regularly arranged semi-solid phase (a gel state). The electric current supplied to the supercapattery 1 can be determined by the amount of the conductive material S filled in the supercapattery 1 so that the conductive material S can absorb electrons to a saturated state, which can be appreciated and controlled by one skilled in the art.

Figure 2A:
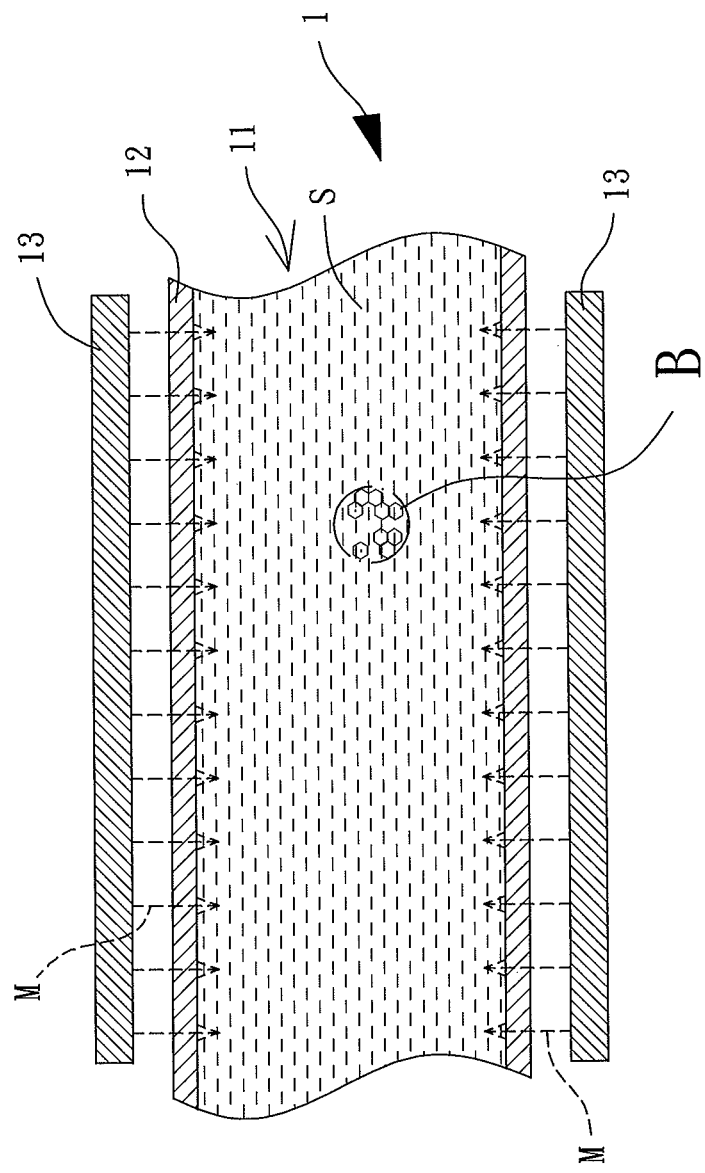
FIG. 2a is a diagrammatic cross sectional view of the supercapattery of FIG. 1a, with the supercapattery in a discharging process.
Figure 2B:
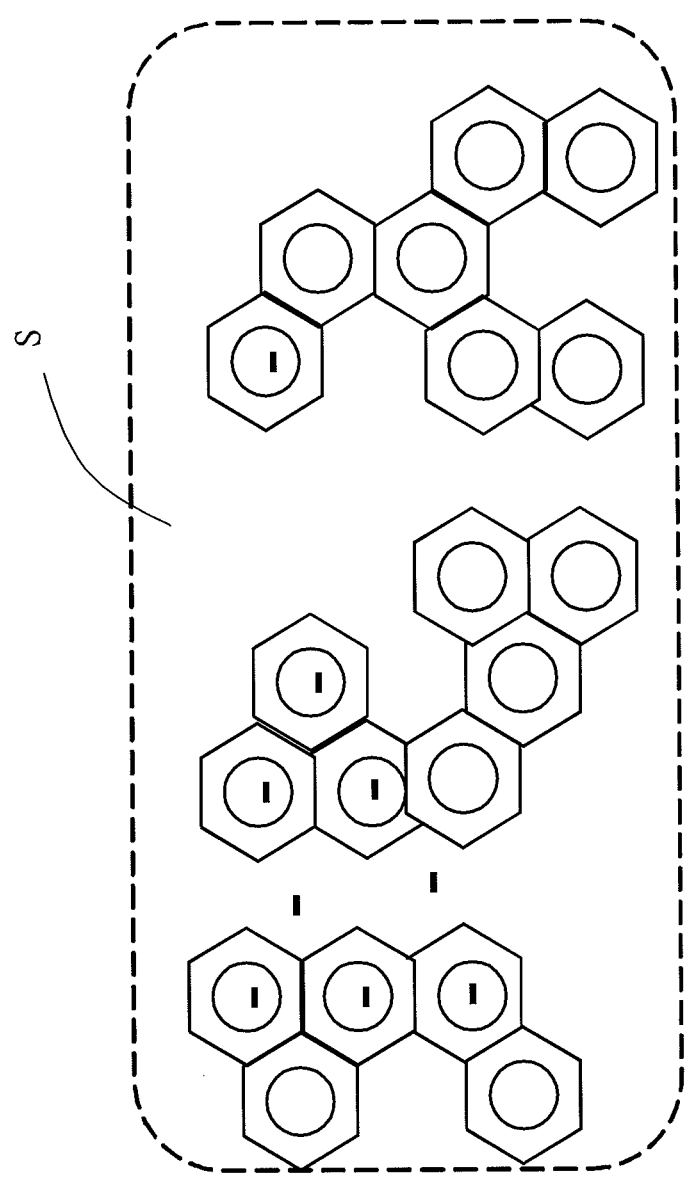

With reference to FIGS. 2a and 2b, after the supercapattery 1 is fully charged and is intended to discharge, electric current is supplied to the magnetic member 13 to create a magnetic field M. The magnetic field M destroys the arrangement of the crystal lattice such that the tight crystal lattice in the electro-nematic phase is gradually pulled by the attraction force of the magnetic field M. The electrons adhered to the surface of the conductive material S moves in the tank 11 due to loosening of the crystal lattice, causing discharge of the supercapattery 1.

The magnitude of the magnetic field M is determined by the amount of electrons to be released and can be maintained to change the arrangement of the crystal lattice of the conductive material S, which can be appreciated by one skilled in the art. Thus, the electron releasing frequency can be controlled to effectively control the discharging efficiency.

Figure 3:
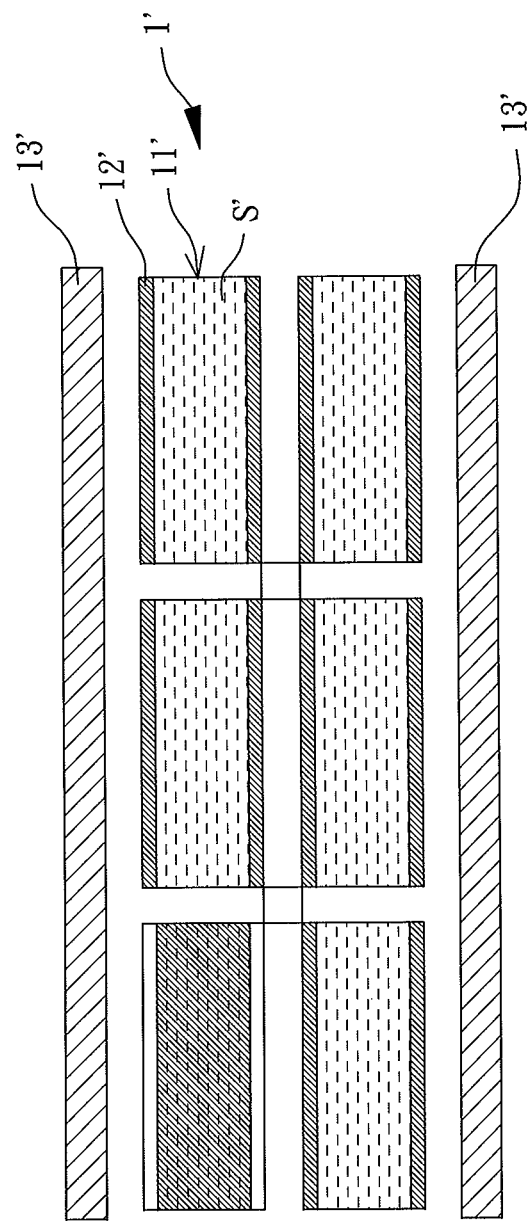
FIG. 3 is a diagrammatic cross sectional view of a supercapattery of another embodiment according to the present invention.

With reference to FIG. 3, in another embodiment, the supercapattery 1' includes a plurality of tanks 11' receiving an electrode unit 12. A magnetic member 13' surrounds the tanks 11' and can create a magnetic field. Each tank 11' is filled with a conductive material S' with an arrangement-variable crystal lattice. The tanks 11' can be connected in series or in parallel. Alternatively, some of the tanks 11' can be connected in series, and others are connected in parallel, as shown in FIG. 3.

In view of the foregoing, by changing the crystal lattice of the conductive material S, S', the tight, regular arrangement of the crystal lattice structure inhibits self discharge of the conductive material S, S' after supply of electricity. Furthermore, under the action of the external magnetic field M, the magnitude of the magnetic field M can be changed to effectively modulate the frequency of the crystal lattice, such that the fully-charged conductive material S, S' in the electro-nematic phase returns to the isotropic phase, leading to movement of electrons and therefore controlling the discharging efficiency of the supercapattery 1, 1'. Thus, by using the method for controlling charge/discharge of a supercapattery 1, 1' by using a magnetic force according to the present invention, the supercapattery 1, 1' can have increased storage capacity and enhanced charging/discharging stability.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A method for controlling charge/discharge of a supercapattery by using a magnetic force, comprising:
    supplying electricity to a supercapattery filled with a conductive material, with the conductive material having an arrangement-variable crystal lattice, with the crystal lattice of the conductive material supplied with electricity being transformed from an isotropic phase into an electro-nematic phase and absorbing electrons; and
    creating an external magnetic field to return the crystal lattice of the conductive material from the electro-nematic phase to the isotropic phase, releasing the electrons.

2. The method as claimed in claim 1, wherein the conductive material is graphite, graphene, graphene oxide, a composite of graphite, metal and a polymer, or a composite of graphene, metal and a polymer.

3. The method as claimed in claim 1, wherein the external magnetic field is created by electrifying a natural magnetic ore, an electromagnetic magnet or a superconductive magnet.

4. The method as claimed in claim 1, wherein the external magnetic filed is created by microwave arc discharge.

* * * * *